A. W. POLTE.
SPEED RECORDING AND INDICATING DEVICE.
APPLICATION FILED SEPT. 30, 1907.
907,400.
Patented Dec. 22, 1908.
2 SHEETS—SHEET 2.
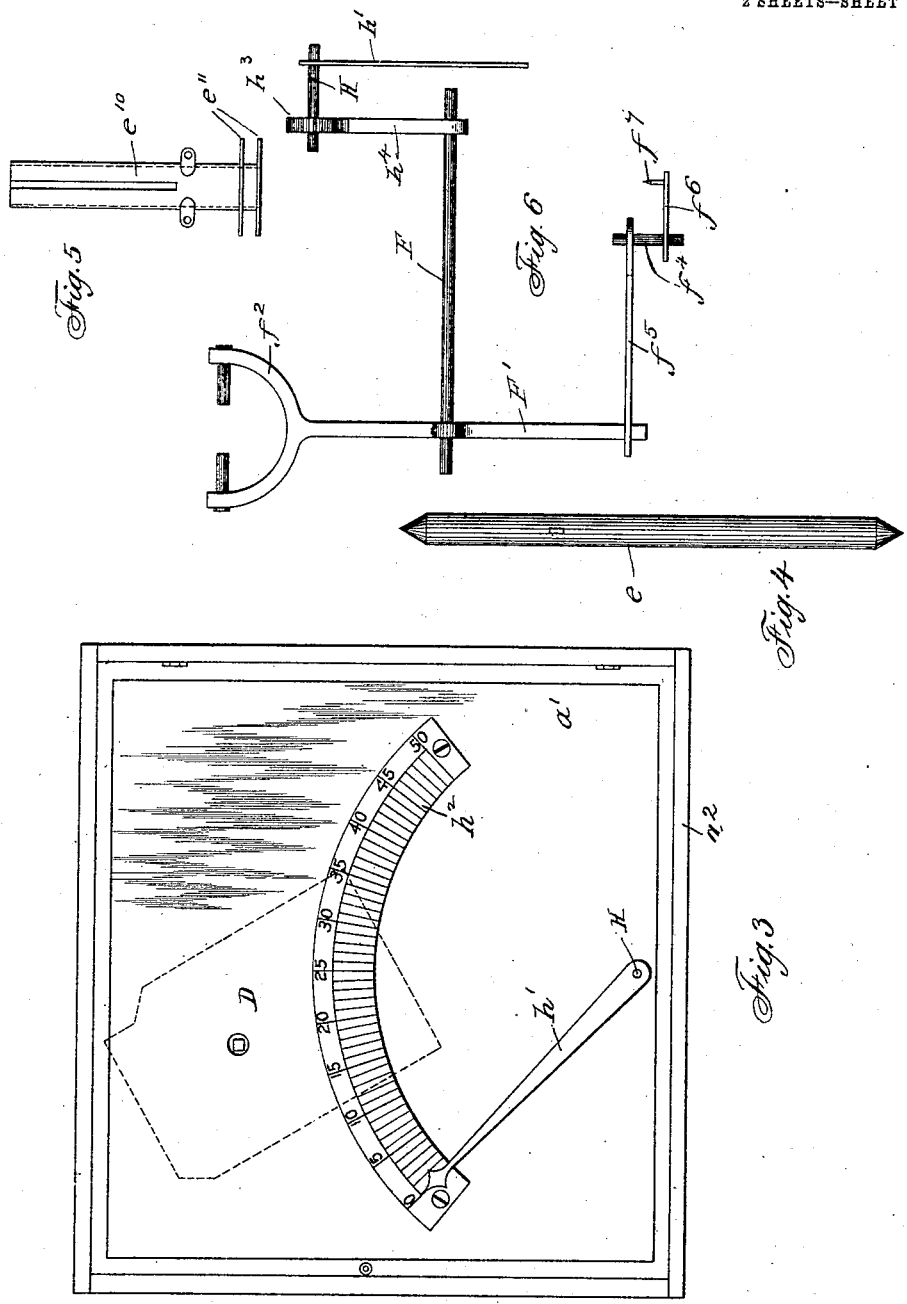
WITNESSES:
John Keller
Henry Parrish
INVENTOR
August W. Polte
BY
ATTORNEY

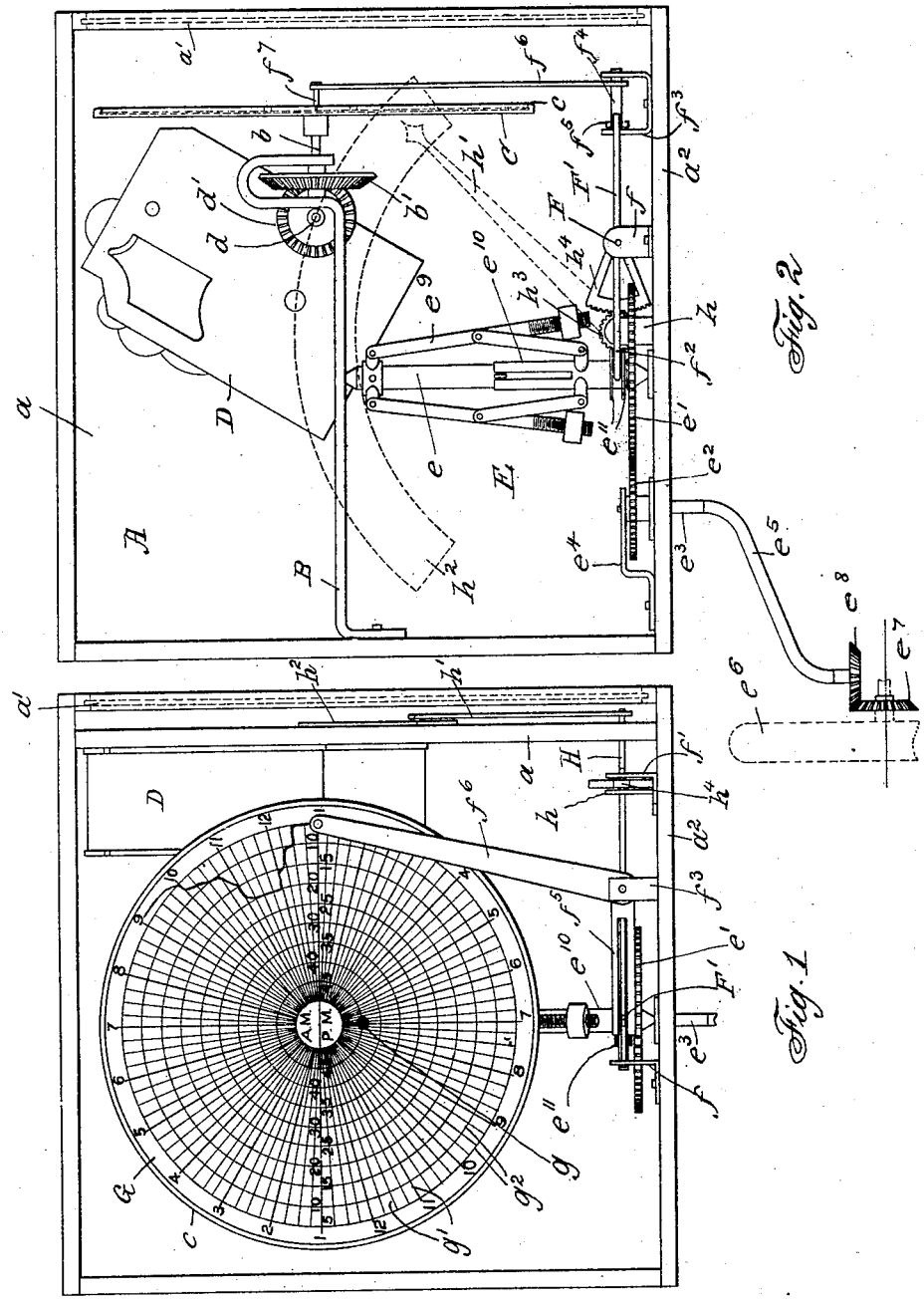

UNITED STATES PATENT OFFICE.

AUGUST WILHELM POLTE, OF CHICAGO, ILLINOIS.

SPEED RECORDING AND INDICATING DEVICE.

No. 907,400.  Specification of Letters Patent.  Patented Dec. 22, 1908.

Application filed September 30, 1907. Serial No. 395,103.

*To all whom it may concern:*

Be it known that I, AUGUST WILHELM POLTE, a citizen of the United States, and residing at Chicago, in the county of Cook and State of Illinois, have invented a new and useful Improvement in Speed Recording and Indicating Devices, of which the following is a complete specification.

This invention relates to improvements in speed recording and indicating devices of that class adapted to make a permanent record of the speed of the vehicle to which attached.

The object of this invention is to provide a device adapted to be connected with the running gear of a vehicle and by means of which the operator or driver can tell at a glance at what rate of speed he is traveling.

It is also an object of the invention to provide a recording device adapted to make a permanent record of the speeds driven at any time during a certain interval, so as to afford a ready reference by means of which the speed driven at any given time may be quickly and accurately ascertained. This is ofttimes desirable for the reason that in certain jurisdictions speed ordinances have been enacted and the question of whether or not the vehicle was exceeding the speed limit at a certain time may become a subject of dispute.

It is also an object of the invention to provide a device adapted to show the time during which the vehicle travels as well as the rates of speed at which it is driven.

It is a further object of the invention to provide a device in which a permanent record is made for a certain period of time and when that period has elapsed said record may be removed and filed away for future reference and a new record sheet inserted in its stead.

The invention consists of the matters hereinafter described in the specification and more fully pointed out and defined in the appended claims.

In the drawings: Figure 1 is a side elevation of the device, with parts removed, and showing the record sheet or disk. Fig. 2 is a rear elevation with the back of the case removed and showing the indicator in dotted lines. Fig. 3 is a front elevation. Fig. 4 is a side elevation of the governor shaft. Fig. 5 is a side elevation of the governor sleeve. Fig. 6 is a plan view of the pointer and indicator operating mechanism.

As shown in said drawings: A indicates a suitable box or case of any preferred construction and material and in which is rigidly engaged to one side wall a horizontal bracket B which extends across the case to a point adjacent the opposite side wall. The front of the case is provided with an inner wall $a$ and an outer wall or door $a'$, the latter of which is hinged to the side of the case and is provided with a transparent plate therein. Journaled in suitable bearings in said bracket B is a shaft $b$, having a beveled gear $b'$ thereon, and at its outer end having rigidly engaged thereon a record carrier C, comprising a circular plate of metal or other preferred material on the outer face of which is a peripheral flange $c$. A clock D of any preferred construction is engaged on the wall $a$ and the hour shaft $d$ thereof projects outwardly from the clock frame to near the beveled gear $b'$, and is provided with a beveled gear $d'$ which is one half the size of the gear $b'$ and acts to drive the same, thereby rotating the record carrier once for every two revolutions of the hour shaft. Journaled in suitable bearings in said bracket B and in the bottom $a^2$ of the case is the shaft $e$ of the centrifugal governor E. Said shaft is provided near its bottom with a gear $e'$ which meshes with a gear $e^2$ on a shaft $e^3$ journaled in the bottom of the case and in a bracket $e^4$ on said bottom. A flexible shaft $e^5$, connected with the shaft $e^3$ is driven from the vehicle wheel $e^6$ by means of suitable gears $e^7$—$e^8$. The arms $e^9$ of said governor are connected with a sleeve $e^{10}$ slidably engaged on said shaft $e$ and provided at its bottom with a pair of flanges $e^{11}$. A pivot shaft F is journaled in brackets $f$—$f'$ on the bottom of the case and rigidly engaged thereon is a lever F' having a yoke $f^2$ on one end adapted to engage between the flanges $e^{11}$ on the sleeve $e^{10}$. Journaled in a bearing bracket $f^3$ on the bottom of the case beneath the record holder is a rock shaft $f^4$ on which is an arm $f^5$ adapted to engage the end of the lever F'. A pointer $f^6$ is also engaged on the rock shaft $f^4$ and is provided at its upper end with a pencil or other tracing instrument $f^7$ adapted to mark on the face of the record sheet or disk G carried on the record holder. The lever F', arm $f^5$ and pointer $f^6$ are so adjusted that when the sleeve $e^{10}$ is at the lower limit of its movement the pencil $f^7$ is at the margin of the disk G. Said disk may be engaged in the record carrier in any preferred manner, but as shown an off centered pin $g$ is engaged on the front of the carrier and extends through an aperture in the disk, thereby holding the disk from rotation independently of the carrier.

The disk is provided on its outer face with a plurality of radial and concentric lines providing graduated scales. The radial lines $g'$ divide the disk into periods of time, as shown quarter hours, and the hours are numbered on the margin from 1 to 12 for the half days both before and after noon. The concentric lines $g^2$ are numbered from the margin of the disk towards the center by fives and indicate the number of miles per hour at which the vehicle is traveling.

An indicator shaft H is journaled in a bracket $h$ and in the front wall $a$, and is provided in its outer end with an indicator $h'$ adapted to travel over a segment scale $h^2$ on the outer face of said wall. On the inner end of said shaft H is a gear $h^3$ in mesh with a segment rack $h^4$ rigidly engaged on the pivot shaft F, so that when the sleeve $e^{10}$ is moved said segment rack acts to rotate the shaft H and move the indicator $h'$ over the scale plate.

The operation is as follows: The governor is driven by the vehicle wheel when the vehicle is in motion and the rapid rotation of the governor arms acts to raise the sleeve to which the yoked end of the pivot lever F' is attached. The yoked end of the lever is thereby raised, causing the opposite end thereof to move downwardly and rotate the rock shaft $f^4$. This causes a movement of the pointer $f^6$ across the face of the disk and the pencil traces a mark thereon to indicate the extent of its travel. The greater the speed of the vehicle, the farther inwardly of the disk will the pointer move. By means of the concentric lines $g^2$ and the line traced by the pencil the approximate speed of the vehicle may be determined. Inasmuch as the record carrier is rotated by the clock the approximate time at which the vehicle was run at various speeds may be determined. Of course the disk may be graduated to cover any period of time desired, and when such period has elapsed the disk is replaced by another. The indicator $h'$ is also operated from the pivot shaft F and travels over the scale plate $h^2$ which is graduated to represent a number of miles and shows at a glance how fast the vehicle is traveling.

While I have shown and described the device as a speed recorder and indicator for vehicles it is obvious that it may be employed to determine and record the speed of any rotary shaft or other article to which it may be attached and obviously many details of construction may be varied without departing from the principles of my invention.

I claim as my invention:

1. In a device of the class described the combination with a casing of a bracket therein, a vertical governor shaft journaled in said bracket and said casing, a centrifugal governor adapted to slide vertically thereon, means for driving said governor, a pivot shaft journaled in suitable bearings on the bottom of the casing, a lever connected at its center with said pivot shaft and extending in either direction therefrom, a fork on said lever engaging said governor, a rock shaft journaled in suitable bearings on the bottom of said casing, a forked arm thereon engaging the end of said lever, an upwardly directed lever on said rock shaft, marking means on the upper end thereof, a shaft journaled in said bracket, a record sheet carried thereon in position to be engaged by said marking means, means for rotating said record sheet, an inner wall in the casing a scale plate carried thereon, a pointer between the inner wall and the outer wall and adjacent said plate, a gear connected with said pointer, and a segment gear carried on the pivot shaft and adapted to rotate said gear and move the pointer over the scale plate.

2. In a device of the class described the combination with a casing of a bracket therein, a horizontal shaft journaled in said bracket, a dish shaped record carrier engaged in a vertical plane on said shaft, an off-centered pin in said carrier, a record sheet engaged on said pin in the carrier and graduated to cover a period of twenty four hours, a clock supported in said casing, means operatively connecting said clock with said shaft and adapted to rotate the carrier once in twenty four hours, a centrifugal governor journaled in said bracket and the bottom of the casing, a horizontal pivot shaft journaled in suitable bearings on the bottom of the casing intermediate said governor and said carrier, a lever engaged at its center thereon, a fork on one end of said lever adapted to engage said governor, a rock shaft journaled in suitable bearings on the bottom of the casing, a pointer thereon extending upwardly adjacent said sheet, a pencil in said pointer adapted to mark on said sheet, a forked arm on said pivot shaft adapted to engage said lever and transmit the motion of the lever to the pointer, a scale plate on the casing, a shaft journaled in the casing below the same, a scale pointer thereon adapted to move over the scale plate, a gear on said shaft, and a segment gear on said pivot shaft adapted to mesh with said gear and operate said scale pointer.

In testimony whereof I have hereunto subscribed my name in the presence of two witnesses.

AUGUST WILHELM POLTE.

Witnesses:
GEORGE E. MANANY,
JOHN KELLER.